March 1, 1966 R. T. ELIAS 3,237,838
SINGLE AND MULTI-BLANK CARTONS
Filed May 6, 1963 6 Sheets-Sheet 1
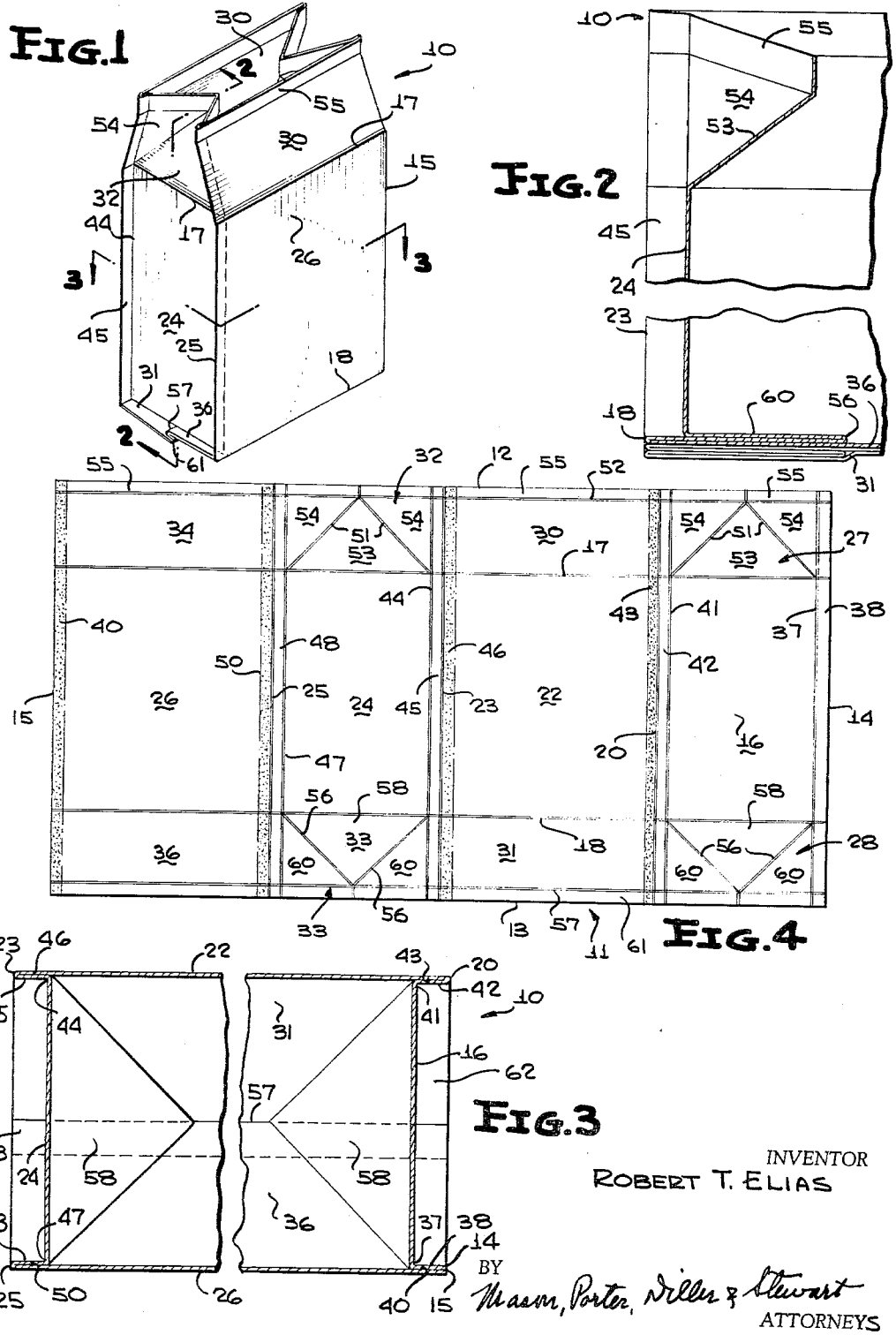
INVENTOR
ROBERT T. ELIAS
BY Mason, Porter, Diller & Stewart
ATTORNEYS

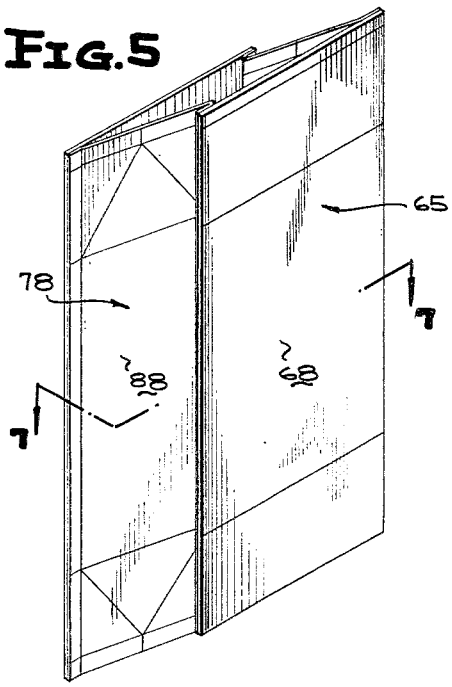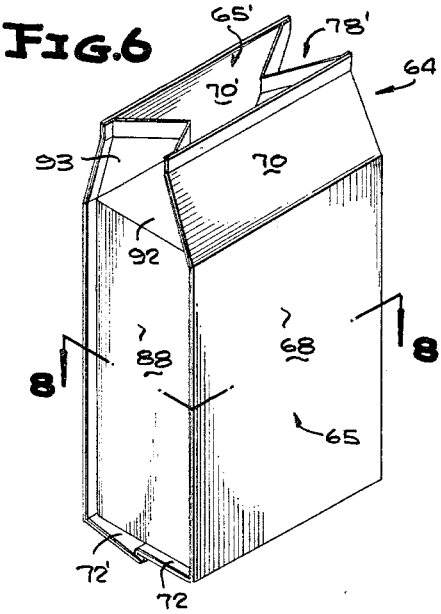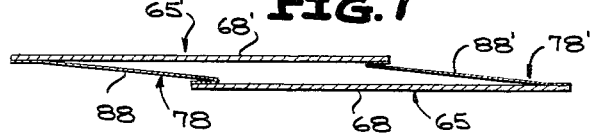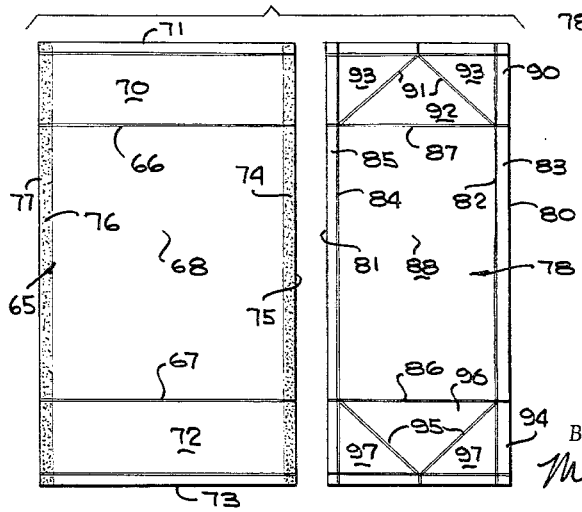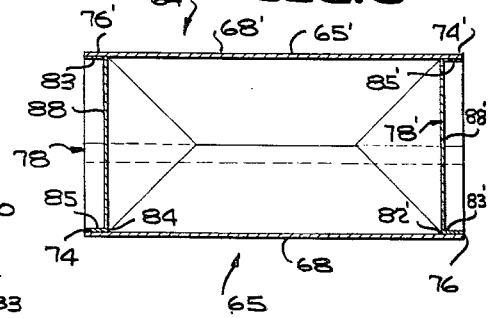

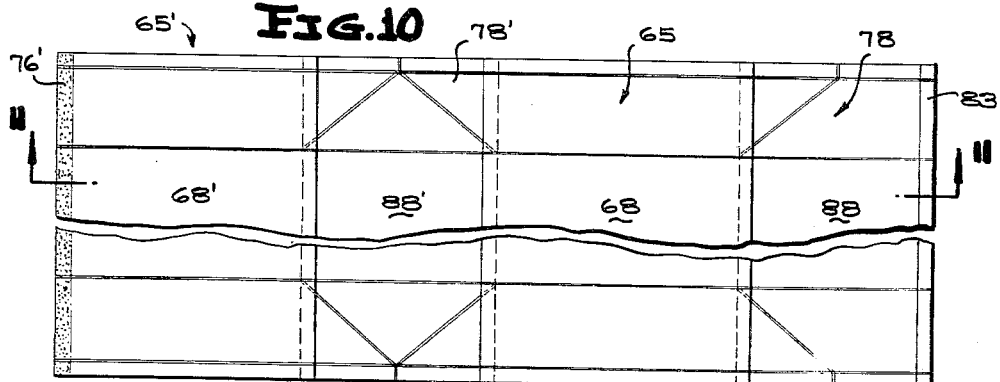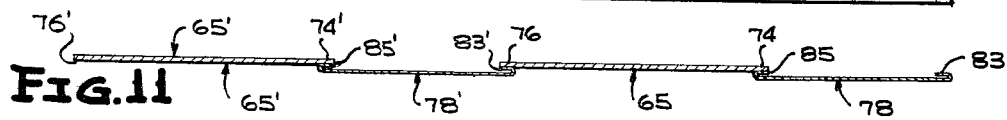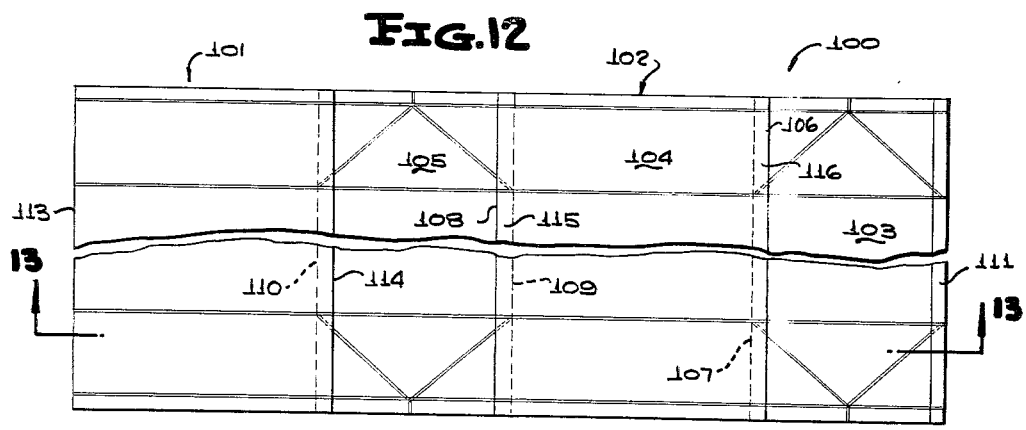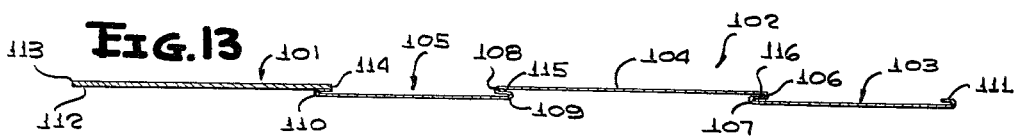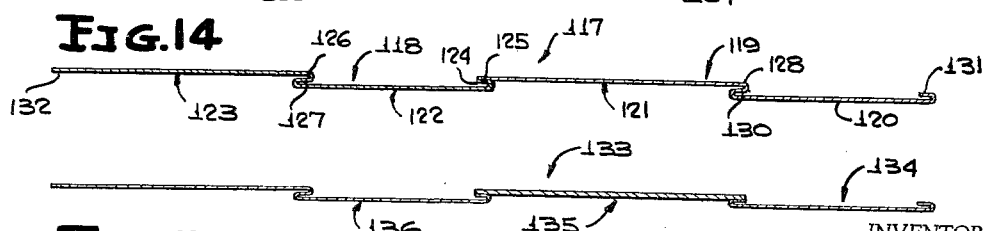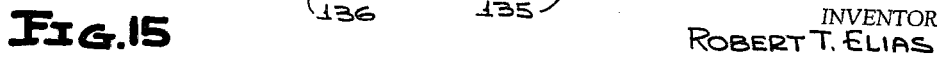

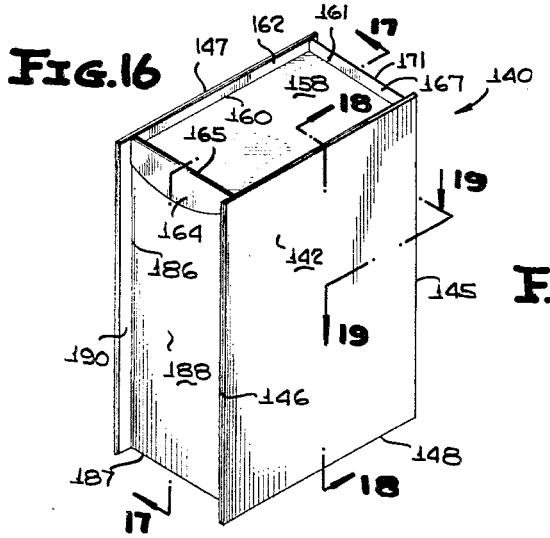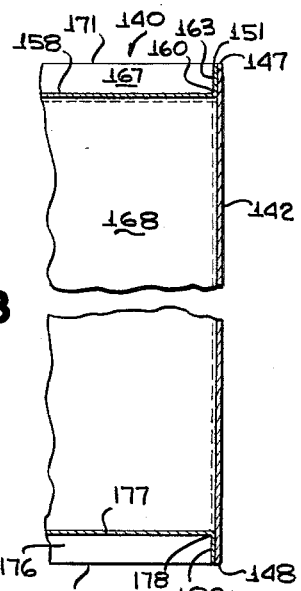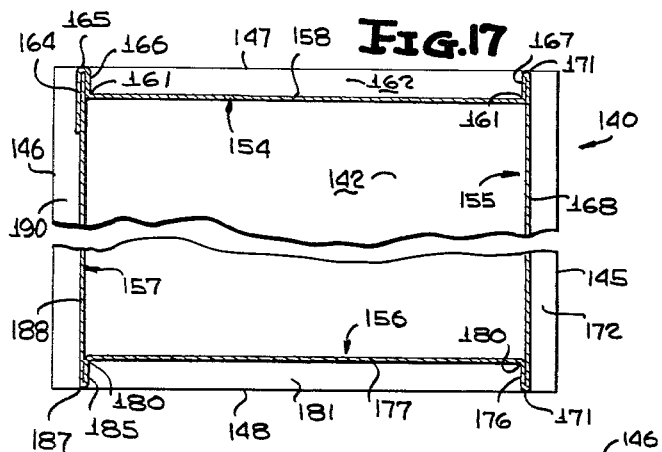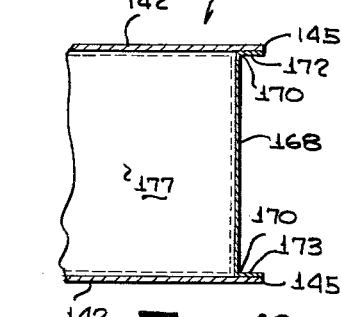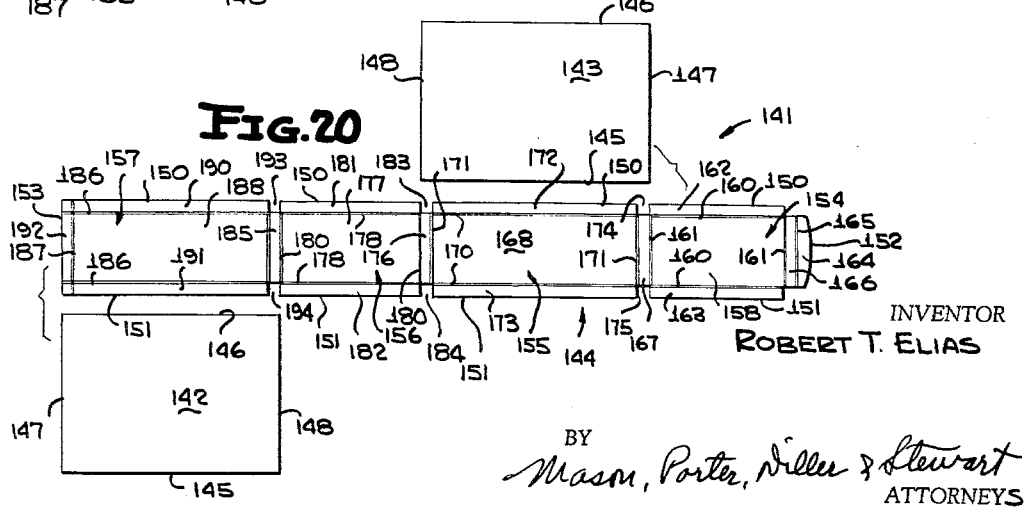

March 1, 1966  R. T. ELIAS  3,237,838
SINGLE AND MULTI-BLANK CARTONS
Filed May 6, 1963  6 Sheets-Sheet 5
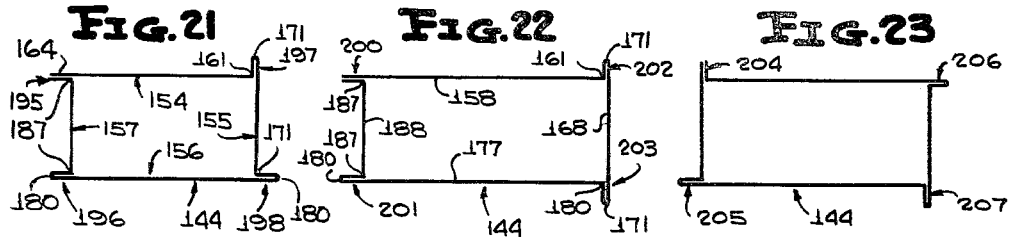
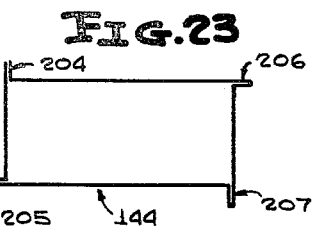
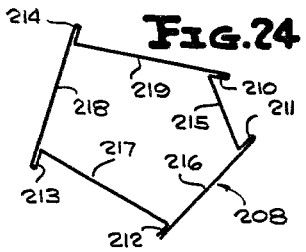
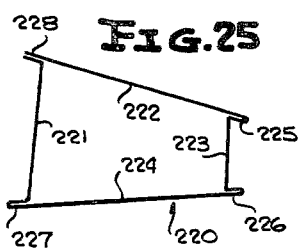
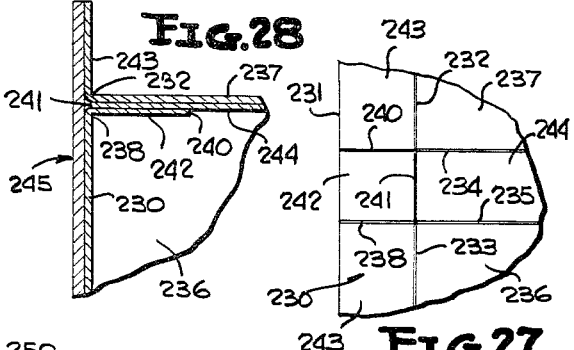
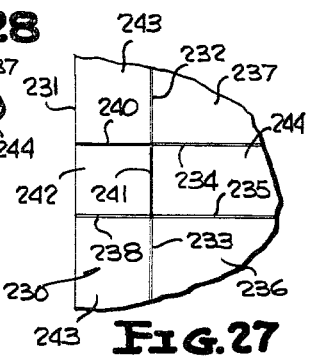
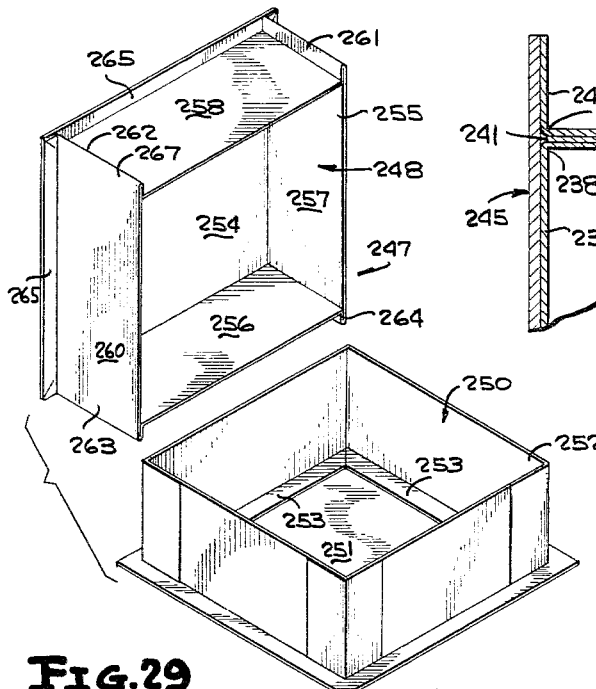
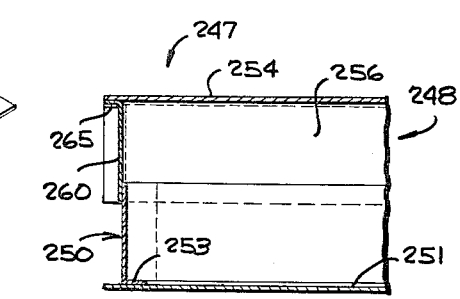
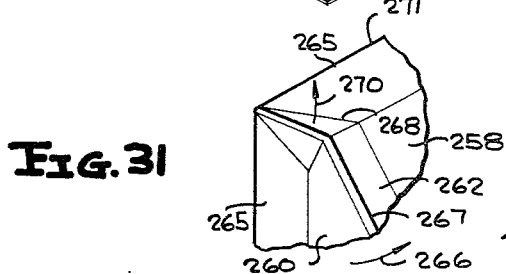
INVENTOR
ROBERT T. ELIAS
BY Mason, Porter, Diller & Stewart
ATTORNEYS March 1, 1966 R. T. ELIAS 3,237,838
SINGLE AND MULTI-BLANK CARTONS
Filed May 6, 1963 6 Sheets-Sheet 6
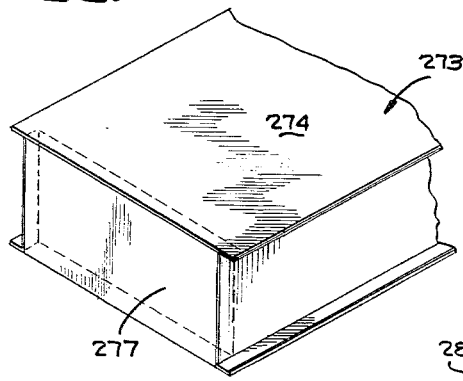
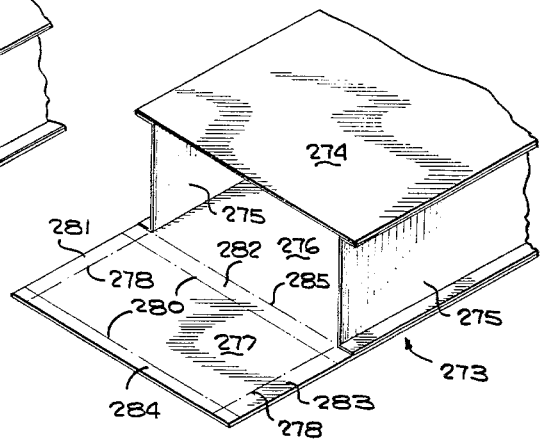
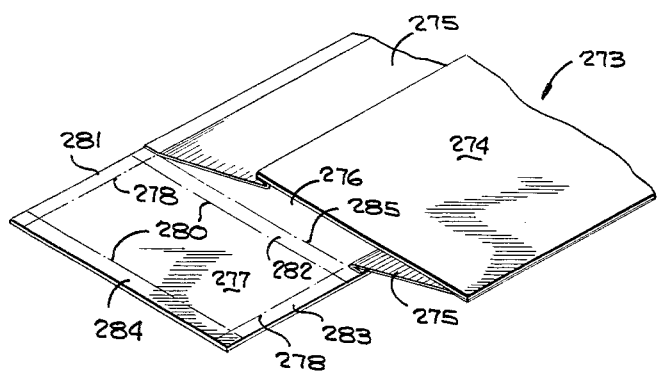
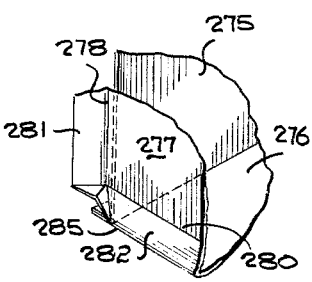
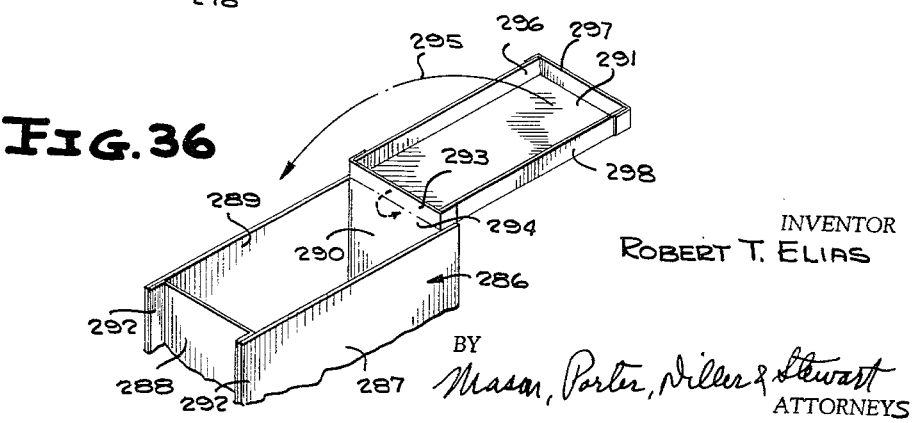
INVENTOR
ROBERT T. ELIAS
ATTORNEYS United States Patent Office 3,237,838
Patented Mar. 1, 1966

3,237,838
SINGLE AND MULTI-BLANK CARTONS
Robert T. Elias, Downers Grove, Ill., assignor to Continental Can Company, Inc., New York, N.Y., a corporation of New York
Filed May 6, 1963, Ser. No. 278,138
15 Claims. (Cl. 229—23)

This invention relates to a novel foldable carton constructed from reinforced paperboard and affording a more rigid structure at any given weight of paper or paperboard, thus providing a carton which is neater in appearance and more durable in use.

An object of this invention is the provision of a novel carton constructed from a single blank of paper stock material, the carton including a front panel, a back panel and a pair of opposed side panels defining a substantially polygonal carton or container body, each of the opposed side panels including a pair of spaced, flange-forming panel strips, one of the panel strips of each of the pair of flange-forming panel strips being overlyingly secured to the front panel and the other of the pair of spaced flange-forming panel strips being overlyingly secured to the back panel of the carton body thereby forming a plurality of integral, rigid flanges at each juncture of adjacent panels of the carton body.

Another object of this invention is the provision of a novel carton of the character immediately above described, the carton having substantially identical top and bottom panels provided with respective top and bottom flanges forming continuations of each of the flanges formed by the flange-forming panel strips.

Still another object of this invention is the provision of a novel carton of the type described wherein the blank from which the carton is constructed is coated with a liquid-proof coating and all rough edges of the blank unprotected by the liquid-proof coating are unexposed to the interior of the carton body.

Still another object of this invention is to provide a novel leak-proof carton constructed from paper stock material, the carton including a bottom panel, two opposed side panels, a top panel, a front panel and a back panel, the plurality of panels forming a substantially rectangular carton body, at least some of the plurality of panels being formed from separate pieces of paper stock material provided with flange-forming panel strips, the flange-forming panel strips being employed to perform the dual function of securing the individual separate panels together to form a substantially rectangular carton blank and being foldable to form a plurality of rigid reinforcing flanges at each junction of adjacent panels.

A further object of this invention is the provision of a novel carton of the type described above wherein the top panel, the front panel, and the side panels are each formed from a single perfectly rectangular piece of paper stock material or alternatively, three of these panels are constructed from a single piece of paper stock material while a fourth panel is formed from a separate piece of material, or the side and front panels are constructed from a single piece of material while the remaining two panels are either formed from one separate piece or two separate pieces of paper stock material, and whatever the combination of pieces forming the carton, the same includes a plurality of rigid reinforcing flanges at each junction of adjacent panels of the carton body and no raw edge of any of the plurality of panels is exposed to the interior of the carton body.

A further object of this invention is to provide a novel carton of the type immediately above described wherein the panels of the carton body subjected to severe bending or folding are constructed from thin, light-weight paper stock material having substantially long fibers while the panels of the carton body subjected to slight bending or folding are formed from substantially stiffer and heavier weight paper stock material, thereby forming a folding carton in which each panel optimumly performs its own particular purpose without at the same time having the qualities which a neighboring panel of the plurality of panels might need for a different purpose.

Another object of this invention is the provision of a novel carton constructed of paper stock material and of a substantially polygonal configuration as above described, the carton including a plurality of corners, each corner being positioned wherever three panels of the plurality of panels intersect, and in addition, to provide three flanges extending outwardly from each of these corners.

Still another object of this invention is to provide a novel paper stock carton of the type heretofore described in which the top panel of the carton body or the bottom panel of the carton body or both of these panels are of a channel-type or tray-type construction secured either to any one of the plurality of flange-forming panel strips or to one of the plurality of panels and yet retain the leak-proof characteristics of the carton.

With the above and other objects in view that will hereinafter appear, the nature of the invention will be more clearly understood by a reference to the following detailed description, the appended claims and the several views illustrated in the accompanying drawings.

In the drawings:

FIGURE 1 is a side perspective view of a folding carton or container constructed in accordance with this invention, and illustrates two of four vertical, rigid reinforcing flanges, each formed from a flange-forming panel strip of a side panel overlying and secured to a panel adjacent the side panel.

FIGURE 2 is an enlarged fragmentary vertical sectional view taken along line 2—2 of FIGURE 1, and shows a reinforced, folded bottom wall of the carton.

FIGURE 3 is a fragmentary enlarged transverse sectional view taken along line 3—3 of FIGURE 1, and illustrates the four vertical integral reinforcing flanges of the folding carton.

FIGURE 4 is a top plan view of a substantially rectangular blank from which the folding carton of FIGURES 1 through 3 is constructed.

FIGURE 5 is a side elevational view of another folding carton constructed in accordance with this invention, and illustrates a carton body constructed from a plurality of separate, substantially rectangular panels secured together.

FIGURE 6 is a side elevational view of the carton body of FIGURE 5, and illustrates the carton body of FIGURE 5 after the same has been set-up, a bottom wall thereof closed and sealed, and an open-mouth top prior to filling the carton with a product and sealing the same.

FIGURE 7 is a transverse sectional view taken along the line 7—7 of FIGURE 5, and illustrates the folding carton in a substantially flat condition for purposes of shipping, storage and prior to being set-up to the position illustrated in FIGURE 6.

FIGURE 8 is a transverse sectional view taken along line 8—8 of FIGURE 6 and illustrates the cross-sectional configuration of the set-up carton of FIGURE 6.

FIGURE 9 is an exploded top plan view of a pair of dissimilar rectangular pieces of sheet material, two of the larger illustrated rectangular pieces forming the front and back panels of the folding carton and two of the smaller rectangular pieces forming identical opposed side walls of the folding carton.

FIGURE 10 is a fragmentary top plan view of a substantially rectangular composite blank formed from a plurality of the rectangular pieces of sheet material of FIGURE 9, and illustrates the dissimilar rectangular pieces alternately secured together to form the composite blank from which the folding carton of FIGURES 5 through 8 is constructed.

FIGURE 11 is a longitudinal sectional view taken along line 11—11 of FIGURE 10 and illustrates the substantial flat configuration of the composite blank and a pair of spaced flange-forming panel strips on each of the narrower of the rectangular pieces underlying and secured adjacent longitudinal edges of the wider of the two rectangular pieces of FIGURE 9 to form a plurality of substantially identical rigid reinforcing flanges of the carton body.

FIGURE 12 is a fragmentary top plan view of a substantially rectangular composite blank, similar to the composite blank of FIGURE 10, but differing therefrom in that only two substantially rectangular pieces of sheet material are secured together to form the composite blank.

FIGURE 13 is a longitudinal sectional view taken along line 13—13 of FIGURE 12, and more clearly illustrates the cross-sectional configuration and folding of the two rectangular blanks of FIGURE 12.

FIGURE 14 is a longitudinal sectional view of a composite blank, similar to the composite blanks of FIGURES 10 through 13, but formed from only two rectangular blanks secured together.

FIGURE 15 is a longitudinal sectional view of another composite blank, and illustrates three substantially rectangular pieces of sheet material folded and secured together to form the composite blank.

FIGURE 16 is a side elevational view of another carton constructed in accordance with this invention, and illustrates a plurality of spaced reinforcing flanges formed from a plurality of flange-forming panel strips of a side and top panel of the carton.

FIGURE 17 is an enlarged fragmentary vertical sectional view taken along line 17—17 of FIGURE 16, and illustrates a plurality of horizontally extending reinforcing flanges of the carton.

FIGURE 18 is an enlarged fragmentary vertical sectional view taken along line 18—18 of FIGURE 16, and illustrates a vertical side flange formed between a front panel and a pair of opposed top and bottom panels of the carton.

FIGURE 19 is an enlarged fragmentary transverse sectional view taken along line 19—19 of FIGURE 16, and more clearly illustrates a pair of vertical reinforcing flanges formed from a side panel, a front panel, and a back panel of the carton.

FIGURE 20 is a top plan view of a plurality of components from which the carton of FIGURES 16 through 19 is constructed, and illustrates a pair of substantially identical rectangular panels and an elongated rectangular panel.

FIGURE 21 is a reduced diagrammatic transverse sectional view through a carton similar to the carton of FIGURES 16 through 19, but differing therefrom in the particular configuration of the reinforcing flanges, and illustrates a modified reinforcing flange structure.

FIGURE 22 is a diagrammatic transverse sectional view through a carton similar to the carton of FIGURE 21, and illustrates another modification of the reinforcing flange structure.

FIGURE 23 is a diagrammatic transverse sectional view through another carton of this invention, and illustrates a further modification of the renforcing flange structure.

FIGURE 24 is a diagrammatic transverse sectional view through a carton similar to the cartons of FIGURES 16, and 21 through 23, and illustrates a polygonal shaped carton having reinforcing flanges directed in oblique relationship to each other.

FIGURE 25 is a diagrammatic transverse sectional view through another carton of this invention, and illustrates a pair of parallel panels and a pair of non-parallel panels combined to form a carton having a plurality of vertical reinforcing flanges.

FIGURE 26 is an enlarged fragmentary perspective view of a corner formed by the intersection of any three panels of the cartons of FIGURES 16, and 21 through 25, and shows a tab portion struck from the material of one panel and adhesively secured to a reinforcing flange constructed from overlapped flange-forming panel strips of the other two panels.

FIGURE 27 is an enlarged fragmentary plan view of a portion of a blank from which the corner construction of FIGURE 26 is fabricated, and illustrates a pair of severance lines which form the tab.

FIGURE 28 is an enlarged fragmentary sectional view taken along line 28—28 of FIGURE 26, and more clearly illustrates the overlapping construction between the tab and the reinforcing flange.

FIGURE 29 is a top perspective view of another carton constructed in accordance with this invention, and illustrates a two-piece carton having a top constructed from two pieces of paper stock material and provided with a plurality of reinforcing flanges formed from a plurality of flange-forming panel strips of one of the pieces of material.

FIGURE 30 is a fragmentary vertical sectional view through the carton of FIGURE 29, and illustrates the top prior to being fully telescoped about a bottom of the carton.

FIGURE 31 is an enlarged fragmentary perspective view of one corner of the top of the carton of FIGURE 30, and illustrates the corner prior to being completely folded.

FIGURE 32 is a fragmentary end perspective view of another carton, and illustrates a recessed tray-shaped panel formed from a single rectangular panel and bounded on all sides thereof by a reinforcing flange.

FIGURE 33 is a fragmentary end perspective view of the carton of FIGURE 32, and illustrates the rectangular piece of material prior to being folded into the interior of the carton to form the recessed panel of FIGURE 32.

FIGURE 34 is a fragmentary end perspective view of the carton of FIGURE 33, and illustrates the carton in a partially knock-down position.

FIGURE 35 is an enlarged fragmentary end perspective view of a corner of the carton of FIGURES 32 through 34, and illustrates the corner of the carton prior to the completed position thereof illustrated in FIGURE 32.

FIGURE 36 is a fragmentary top perspective view of a carton similar to the carton of FIGURES 32 through 35, but illustrates a top panel which is secured to a panel strip which performs the dual function of providing a hinge for the panel and forming a reinforcing flange.

A carton constructed in accordance with this invention is best illustrated in FIGURES 1, 2 and 3 of the drawings and is generally designated by the reference numeral 10. The construction of the carton 10 will be best understood by first describing a blank 11 of FIGURE 4, from which the carton 10 is fabricated.

The blank 11 is a single piece of substantially rectangular paper stock material having a first longitudinal edge 12, a second longitudinal edge 13, a first transverse edge 14 and a second transverse edge 15.

The blank 11 includes a first side panel 16 located between a first longitudinal fold line 17, a second longitudinal fold line 18, a first transverse fold line 20 and a first transverse edge 14 of the blank 11. A back or rear panel 22 is adjacent the first side panel 16 and is bounded by the first transverse fold line 20, the longitudinal fold lines 17 and 18, and a second transverse fold line 23 spaced from and parallel to the first transverse fold line 20. A second side panel 24 is defined by an area of the blank 11 enclosed by the second transverse fold line 23, the longitudinal fold lines 17 and 18, and a third transverse fold line 25 spaced from and parallel to the second transverse fold line 23. The third transverse fold line 25 together with the longitudinal fold lines 17 and 18, and the second transverse edge 15 bound a front panel 26 of the blank 11.

A first top panel portion 27 is formed in the blank 11 and is set off by portions of the first transverse edge 14, the first longitudinal edge 12, the first transverse fold line 20 and the first longitudinal fold line 17. An identical first bottom panel portion 28 of the blank 11 is bounded by portions of the first transverse edge 14, the second longitudinal edge 13, the first transverse fold line 20 and the second longitudinal fold line 18.

A second top panel portion 30 is adjacent the first top panel portion 27 and is set off by portions of the first transverse fold line 20, the first longitudinal edge 12, the second transverse fold line 23 and the first longitudinal fold line 17. A second bottom panel portion 31, identical to the second top panel portion 30, is formed in the blank 11 and bounded by portions of the first transverse fold line 20, the second longitudinal edge 13, the second transverse fold line 23 and the second longitudinal fold line 18.

A third top panel portion 32 adjacent the second top panel portion 30 is bounded by portions of the first longitudinal edge 12, the third transverse fold line 25, the first longitudinal fold line 17 and the second transverse fold line 23. The third top panel portion 32 is identical to the first top panel portion 27 and the first bottom panel portion 28.

A third bottom panel portion 33 is located adjacent the second bottom panel portion 31 of the blank 11, and is set off by portions of the second transverse fold line 23, the second longitudinal edge 13, the third transverse fold line 25 and the second longitudinal fold line 18. The third bottom panel portion 33 is identical to the panel portions 27, 28 and 32.

A fourth top panel portion 34 is located adjacent the third top panel portion 32 and is bounded by portions of the first longitudinal edge 12, the third transverse fold line 25, the first longitudinal fold line 17 and the second transverse edge 15. The fourth top panel portion 34 is identical to the panel portions 30 and 31.

A fourth bottom panel portion 36 is provided in the blank 11 adjacent the third bottom panel portion 33 and is bounded by portions of the third transverse fold line 25, the second longitudinal edge 13, the second transverse edge 15 and the second longitudinal fold line 18. The fourth bottom panel portion 36 is identical to the panel portions 30, 31 and 34.

The top panel portions 27, 30, 32 and 34 are foldable in a manner to be hereinafter described to form a top panel of the carton 10 while the bottom panel portions 28, 31, 33 and 36 are similarly foldable to form a bottom panel of the carton 10.

A first transverse flange-forming fold line 37 is formed in the blank 11 between the longitudinal edges 12 and 13 thereof. The first transverse flange-forming fold line 37 sets off a first flange-forming strip 38 with the first transverse edge 14. The first flange-forming strip 38 is adapted to overlie and be secured to a first adhesively coated transverse strip 40 adjacent the second transverse edge 15 of the blank 11.

A second transverse flange-forming fold line 41 extends between the longitudinal edges 12 and 13 of the blank 11 parallel to and adjacent the first transverse fold line 20. The second transverse flange-forming fold line 41 defines a second flange-forming strip 42 with the first transverse fold line 20. The second flange-forming strip 42 is adapted to overlie and be adhesively secured to a second adhesively coated transverse strip 43 adjacent the first transverse fold line 20 and extending between the longitudinal edges 12 and 13. The second flange-forming strip 42 and the second adhesively coated transverse strip 43 form a second reinforcing flange of the container 10 in a manner which shall be hereinafter described.

A third transverse flange-forming fold line 44 is formed in the blank 11 between the longitudinal edges 12 and 13 thereof in parallel spaced relation to the second transverse fold line 23. The third transverse flange-forming fold line 44 and the second transverse fold line 23 set off a third flange-forming strip 45. The third flange forming strip 45 is adapted to overlie a third adhesively coated transverse strip 46 adjacent the second transverse fold line 23 and extending between the longitudinal edges 12 and 13. The third flange-forming strip 45 and the third adhesively coated transverse strip 46 form a third reinforcing flange of the carton 10.

A fourth transverse flange-forming fold line 47 is provided in the blank 11 adjacent the third transverse fold line 25 and sets off therewith a fourth flange-forming strip 48. The fourth flange-forming strip 48 is adapted to be bonded to a fourth adhesively coated transverse strip 50 extending adjacent the third transverse fold line 25 between the longitudinal edges 12 and 13 of the blank 11 to form a fourth reinforcing flange of the carton 10.

The first top panel portion 27 and the third top panel portion 32 are identical and each includes a pair of upwardly converging fold lines 51 which converse at a third longitudinal fold line 52. The converging fold lines 51 separate the top panel portions 27 and 32 into an isosceles-shaped triangular portion 53 and a pair of spaced triangular portions 54. A top panel sealing strip 55 is set off between the third longitudinal fold line 52 and the first longitudinal edge 12.

The first bottom panel portion 28 and the third bottom panel portion 33 are identical, and each includes a pair of converging fold lines 56 terminating at a fourth longitudinal fold line 57. Each of the pair of converging fold lines 56 divide the first and third bottom panel portions 28 and 33, respectively, into an isosceles-shaped triangular portion 58 and a pair of spaced triangular portions 60. A bottom panel sealing strip 61 is set off between the fourth longitudinal fold line 57 and the second longitudinal edge 13.

To form the carton 10 from the blank 11 of FIGURE 4 the first flange-forming strip 38 is sealed to the first adhesively coated transverse strip 40, as is best illustrated in FIGURE 3 of the drawings. The first flange-forming strip 38 and the first adhesively coated tranverse strip 40 form a first reinforcing flange of the carton 10.

A second reinforcing flange of the carton 10 is formed by sealing the second flange-forming strip 42 against the second adhesively coated transverse strip 43.

A third reinforcing flange of the carton 10 is formed by sealing the third flange-forming strip 45 against the third adhesively coated transverse strip 46, while a fourth and last reinforcing flange is formed by sealing the fourth flange-forming strip 48 to the fourth adhesively coated transverse strip 50.

As is best illustrated in FIGURE 3 of the drawings the side panels 16 and 24 are in recessed, opposed parallel relationship to each other and normal to the front panel 26 and the back panel 22. Thus, each of the panels 16, 22, 24 and 26 is supported between two substantially rigid reinforcing flanges which prevent the carton from bulging and render the carton 10 stronger for any given weight per unit area of material. While a slightly greater area of paper stock material is required to form the four reinforcing flanges, a carton of equal strength and capacity would require a greater total weight of material, and would thus be less economical than the carton 10 of this invention.

A bottom panel of the carton 10 is formed from the bottom panel portions 28, 31, 33 and 36 by folding the isosceles-shaped triangular portions 58 inwardly toward the axis of the carton 10. This folding of the isosceles-shaped triangular portions 58 brings each of the pair of spaced triangular portions 60 into overlying relationship with the isosceles-shaped triangular portions 58. The fourth bottom panel portion 36 is then folded along the second longitudinal fold line 18, reversely folded along the fourth longitudinal fold line 57 and overlaid by the second bottom panel portion 31. An adhesive applied to the bottom panel sealing strip 61 maintains the bottom panel closed and sealed.

It should be particularly noted that the above described folding of the bottom panel forms a pair of reinforcing flanges 62 and 63 (see FIGURE 3) which are continuations of the first four reinforcing flanges heretofore mentioned. Another pair of reinforcing flanges, identical to the reinforcing flanges 62 and 63 of the bottom panel, are formed in the top panel of the carton 10 when the top panel portions 27, 30, 32 and 34 are folded in a manner identical to that heretofore described in connection with the bottom panel portions 28, 31, 33 and 36.

Thus, the carton 10, when filled and sealed at the top and bottom thereof, is reinforced by four reinforcing flanges when positioned in a vertical upstanding position such as shown in FIGURE 1. When the carton 10 is lying on either the front panel 26 or the back panel 22 thereof, the pair of reinforcing flanges 62 and 63 of the bottom panel, as well as a similar pair of reinforcing flanges of the top panel support the carton and prevent bulging thereof. When the carton 10 lays on either side thereof, the folded and sealed transverse panel sealing strips 55 and 61 form reinforcing flanges to support the carton 10 and prevent bulging thereof.

A carton 64 shown in FIGURE 6 of the drawings is similar to the carton 10 of FIGURES 1, 2 and 3. However, a major difference lies in the fact that the carton 64 is constructed from a plurality of individual substantially rectangular pieces of sheet material which vary in area, composition, weight, grain direction and function.

The carton 64 is constructed from four sheet material blanks, two of which are illustrated in FIGURE 9 of the drawings to which attention is now directed.

A first substantially rectangular sheet material blank 65, which is preferably constructed from paper stock material, includes a pair of transverse fold lines 66 and 67. An area 68 between the spaced pair of fold lines 66 and 67 of the blank 65 defines a front panel 68 of the carton 64. A top panel portion 70 lies between the fold line 66 and a top edge 71 of the blank 65. Similarly, a bottom panel portion 72 lies between the fold line 67 and a bottom edge 73 of the blank 65. The blank 65 is also provided with an adhesive coated strip portion 74 adjacent an edge 75 of the blank 65 and a similar adhesive coated strip portion 76 adjacent an opposite edge 77 of the blank 65.

Another substantially rectangular sheet material blank 78 of FIGURE 9 includes a longitudinal edge 80 and another longitudinal edge 81. A longitudinal fold line 82 sets off a flange-forming strip 83 with the longitudinal edge 80 of the blank 78. Similarly, a longitudinal fold line 84 adjacent the longitudinal edge 81 of the blank 78 sets off therewith a flange-forming strip 85.

A pair of spaced parallel fold lines 86 and 87 and the longitudinal fold lines 82 and 84 bound an area 88 which forms a side panel of the carton 64.

A top panel portion 90 of the blank 78 includes a pair of upwardly converging fold lines 91 which divide the top panel portion 90 into an isosceles-shaped panel portion 92 and a pair of spaced triangular panel portions 93.

Similarly, a bottom panel portion 94 of the blank 78 is provided with a pair of converging fold lines 95 which divide the bottom panel portion 94 into an isosceles-shaped triangular portion 96 and a pair of spaced triangular panel portions 97.

To form the container 64, the blank 65 is joined to the blank 78 by folding the blank 78 along the longitudinal fold line 84 thereof and overlying the flange-forming strip 85 upon the adhesively coated strip 74 of the blank 65. The area 68 of the blank 65 forms a front panel 68 of the carton 64 while the area 88 of the blank 78 forms a first side panel 88 of the carton 64.

A pair of blanks 65' and 78', identical to the respective blanks 65 and 78, are then similarly secured together by overlying a flange-forming strip 85' of the blank 78' upon an adhesively coated strip 74' of the blank 65'. An area 88' of the blank 78' forms a second side panel of the carton 64 while an area 68' of the blank 65' forms a back panel of the carton 64. The flange-forming strip 83 of the blank 78 and a flange-forming strip 83' of the blank 78' are then respectively secured to an adhesive coated strip 76' of the blank 65' and the adhesive coated strip 76 of the blank 65.

The plurality of adhesively joined flange-forming strips and adhesively coated strips form a plurality of reinforcing flanges of the carton 64. A first reinforcing flange is formed by the strips 76 and 83', a second reinforcing flange is formed by the strips 74' and 85', a third reinforcing flange is formed by the strips 76' and 83 while a fourth reinforcing flange is formed by the strip 74 and 85.

A bottom and top panel of the carton 64 are formed by folding the blanks 65, 65', 78 and 78' in a manner identical to that discussed in connection with the formation of the top and bottom panels of the carton 10 of FIGURES 1 through 3, and an additional discussion of this folding is not considered necessary for an understanding of the invention.

It is readily observable, however, from FIGURES 6 and 8 of the drawings that the folding patterns for the side panels 78 and 78' are more complicated than for the folding pattern of the front and back panels 68 and 68' respectively. The degree of bending of the blank 78 is more severe along the fold lines 91 and 95 than along the spaced fold lines 66 and 67 of the blank 65. Furthermore, if the carton 64 is constructed from paper stock material, the quality of paper stock material required for severe folding is generally more expensive than stiffer shorter fibered material. That is, better folding is obtained by using a paper stock material which has long fibers. Thus, where the prime requisite of a carton is stiffness, shorter fibered stiffer paperboard is employed. However, where foldability is a primary requirement, longer fibered paperboard material is employed.

The carton 64 overcomes the disadvantages of cartons which are stiff and relatively non-foldable as well as cartons which are relatively foldable but of insufficient strength. The side panels 78 and 78' are constructed from relatively thin long fibered paper stock material while the front and back panels 68 and 68', respectively, are made from stiffer relatively shorter fibered paper stock material. Thus, the advantages of both long and short fibered material are achieved without sacrificing strength due to the rigid reinforcing flanges of the carton 64. Generally, the front and back panels of a carton are normally display panels while the side panels are information panels. Since the front and back panels 68 and 68' respectively of the carton 64 are relatively stiff, they may be relatively easily printed upon or decorated. Furthermore, the panels 68 and 68' could be readily specially finished to permit fine printing, they may be foil laminated, and if desired, these panels could be of different colors obtained directly from paper manufacturers rather than as obtained by known and more expensive printing processes.

In addition, by constructing the carton 64 from a plurality of individual blanks both paper stock and non-paper stock material could be combined in a single carton. For example, one or both of the said panels 78 and 78' of the carton 64 could be made of plastic material and either one or both of the side panels could be transparent.

When the carton 64 is in the positions illustrated in FIGURES 5 and 7 (prior to being completely flattened for shipping purposes) the front panel 68 and the back panel 68' shift toward each other and should overlie each other in intimate contact to prevent distortion or damage of the blanks during shipment. Intimate contact between the panels 68 and 68′ would be impossible if the blanks 78 and 78′ were not made of a relatively thin material. Furthermore, when the carton 64 is erected the top panel portions 70 and 70′ as well as the bottom panel portions 72 and 72′ must come together and successfully seal past the obstructions offered by the triangular panel portions 92, 93, 96 and 97 of the blank 78 as well as the similar triangular panels associated with the blank 78′. Once again, because of the thinner material of the blanks 78 and 78′ efficient sealing of the panels 70, 70′, 72 and 72′ is facilitated and "leakers" are highly unlikely.

It is also extremely important to recognize that while the carton 64 is constructed from four separate blanks having a total of sixteen "raw" or severed edges, none of these "raw" edges are presented to the interior of the carton 64. Such "raw" edges, if exposed internally to a product packaged in the carton 64, could cause abrasion of the contained product or leakage if the product is a liquid or contains a migratory liquid component. "Raw" edges are also a source of paper dust which could seriously contaminate a product contained in the carton 64.

The carton 64 utilizes the same area of material as the carton 10 of FIGURES 1 through 3. If information was printed on the side panels 16 and 24 of the carton 10, and it was necessary or desirable to change this information the entire carton would necessarily have to be scrapped. Similarly, if the side panels 16 and 24 for the back panel 22 or the front panel 26 or all of these panels were to be made wider or narrower the entire blank 11 would have to be changed. Similarly, if the carton 10 was to be used for seasonal promotions, this could only be accomplished with a maximum of change-over time, maximum scrap and a maximum inventory.

The carton 64 however, could be changed in proportions or in printed information without changing the entire carton. Thus, the side panels 88 and 88′ of the respective blanks 78 and 78′ could be made wider or narrower and yet mate with the front panel 68 and the back panel 68′. If the side panels 88 and 88′ have information printed thereon, it could be changed without scrapping the entire carton 64 by substituting other side panels for the panels 88 and 88′. Seasonal promotions could be handled with a minimum of change-over time, a minimum of scrap and a minimum of inventory by merely changing any one of the blanks of the carton 64.

As heretofore noted, the carton 64 may be shipped to a consumer in the substantially folded condition, such as that shown in FIGURE 7 of the drawings. Alternatively, the carton 64 may be shipped to a consumer in a substantially flat planar condition such as that illustrated in FIGURES 10 and 11 of the drawings. As is shown in FIGURES 10 and 11, the blanks 65, 65′, 78 and 78′ are secured together along the respective adhesively coated strips and flange-forming portions 74′ and 85′, 83′ and 76 and 84 and 85. However, the flange-forming strip 83 and the adhesively coated strip 76′ of the blank 65′ are not adhesively joined. This allows the joined blanks 65′, 78′, 65 and 78 to be shipped in the substantially flat planar condition of FIGURE 11.

It is also possible to ship the joined, composite blank of FIGURE 11 to a consumer without first folding the flange-forming strip 83 of the blank 78 to the position illustrated. That is, the flange-forming strip 83 does not have to be folded as shown, but rather, may occupy its unfolded position in the plane of the blank 78. In either case, the composite blank of FIGURES 10 and 11 can be shipped in a substantially flat planar condition to a customer without the necessity of providing protecting or spacing devices to preclude accidental or inadvertent damage of the composite blank.

It is, of course, not necessary to employ a plurality of blanks such as the blanks 65′, 78′, 65 and 78 to form the carton 64 of FIGURE 6. The same principle would be applicable if three of the blanks of FIGURES 10 and 11 were constructed of a single piece of sheet material and an additional blank were secured thereto. Similarly, a side or a front panel could be constructed from a single piece of paper stock material while the remaining panels could either be constructed from a single separate piece or from two separate pieces of paper stock material. These variations are illustrated in FIGURES 12 through 15 of the drawings.

In FIGURES 12 and 13, a composite blank 100 is constructed from two rectangular sheets of paper stock material 101 and 102. The blank 101 is identical to the blank 68 of FIGURE 9.

The rectangular blank 100, however, is folded to form a first side panel 103, a front panel 104 and a second side panel 105. The first and second side panels 103 and 105 respectively are identical to the blank 78 of FIGURE 9 except the side panels 103 and 105 are formed by folding the rectangular blank 102 along a plurality of fold lines 106, 107, 108, 109 and 110 whereas the blank 78 forming the side panel 88 of the carton 64 is constructed from a single severed piece of rectangular material.

A carton substantially identical to the carton 64 of FIGURE 6 can be erected from the composite blank 100 by securing a flange-forming strip 111 of the first side panel 103 to an adhesively coated strip 112 adjacent an edge 113 of the blank 101. The secured portion 111 and the strip 112 form a first reinforcing flange. A second reinforcing flange 114, a third reinforcing flange 115 and a fourth reinforcing flange 116 are also formed in a manner clearly shown in FIGURE 13 of the drawings. It is only necessary to note that an adhesive is applied to the panel 104 adjacent the fold lines 106 and 108 prior to folding to bond together the portions of the panel 104 forming the reinforcing flanges 115 and 116. It is important to note that the blank 102 is constructed from thinner material than the blank 101 to enable the first and second side panels 103 and 105 respectively to fold more readily in the manner heretofore discussed.

With reference to FIGURE 14 of the drawings, a composite blank 117 is illustrated and includes a first rectangular blank 118 and a second rectangular blank 119. The composite blank 117 is substantially identical to the blanks of FIGURES 10 through 13 except that only two blanks, 118 and 119, are employed to form a first side panel 120, a front panel 121, a second side panel 122 and a back panel 123. The blanks 118 and 119 are adhesively joined together by a folded flange-forming portion 124 of the second side panel 122 in underlying engagement with an adhesively coated flange-forming portion 124 and the adhesively coated strip 125 to form a reinforcing flange similar to the reinforcing flange formed by the flange-forming portion 83′ and the adhesive coated strip 76 of FIGURE 11.

A second reinforcing flange is formed by securing an adhesive coated strip 126 of the back panel 123 to a flange-forming portion 127 while a third reinforcing flange is formed by securing an adhesively coated strip 128 of the back panel 121 to a similarly folded flange-forming strip 130. A fourth reinforcing flange is formed by securing a flange-forming strip 131 of the first side panel 120 to an adhesively coated strip 132 of the front panel 123. A composite blank 133 of FIGURE 15 includes a first individual side panel 134, a separate heavier gauge back panel 135 and a front and second side panel forming blank 136. The composite blank is folded in the manner heretofore noted in connection with FIGURES 10–14 to form a full-flanged carton, i.e., a carton having reinforcing flanges similar to those illustrated in FIGURES 1 and 6. The side panels 134 and 136 are, again, constructed from a thinner, longer fiber material than the stiffer back panel 135 for the reasons heretofore mentioned.

A carton 140 shown in FIGURES 16 through 19 is erected from a three-part composite blank 141 of FIG- URE 20. The blank 141 includes identical respective front and back panel forming blanks 142 and 143, and an elongated rectangular blank 144.

Each of the blanks 142 and 143 includes a first side edge 145, a second side edge 146, a top edge 147 and a bottom edge 148. The substantially rectangular panel forming blanks 142 and 143 form respective front and back panels of the carton 140 in a manner to be hereafter described more fully.

The elongated rectangular blank 144 includes a first discontinuous longitudinal edge 150 and a second discontinuous longitudinal edge 151. The elongated rectangular blank 144 further includes a first transverse edge 152 and a second transverse edge 153. The rectangular blank 144 includes a top panel portion 154, a first side panel portion 155, a bottom panel portion 156 and a second side panel 157.

The top panel portion 154 includes a top panel 158 bounded by a pair of longitudinal fold lines 160 and a pair of transverse fold lines 161. A first top flange forming strip 162 is set off by the first longitudinal edge 150 and an adjacent longitudinal fold line 160. A second top flange forming strip 163 is set off by the longitudinal edge 151 and the adjacent longitudinal fold line 160. A tab 164 of the top panel portion 154 is provided with a transverse fold line 165 in spaced parallel relationship to the adjacent fold line 161. A flange-forming strip 166 lies between the transverse fold line 165 and the adjacent transverse fold line 161.

The first side panel portion 155 is joined to the top panel portion 154 by an integral fourth flange-forming strip 167. The first side panel portion 155 includes a first side panel 168 bounded by a pair of longitudinal fold lines 170 and a pair of transverse fold lines 171. A fifth flange-forming strip 172 is set off by the longitudinal fold line 170 adjacent the discontinuous longitudinal edge 150. A sixth flange-forming strip 173 is similarly set off by the discontinuous longitudinal edge 151 and the adjacent longitudinal fold line 170. A cut-out portion 174 is formed between the first flange-forming strip 162 and the fifth flange-forming strip 172 while a similar cut-out portion 175 is provided between the second flange-forming strip 163 and the sixth flange-forming strip 173. The first side panel portion 155 of the blank 144 is joined to the bottom panel portion 156 by an integral seventh flange-forming strip 176.

The bottom panel portion 156 includes a bottom panel 177 set off by a pair of parallel, spaced longitudinal fold lines 178 and a pair of parallel spaced transverse fold lines 180. The longitudinal fold line 178 adjacent the discontinuous longitudinal edge 150 defines therewith an eighth flange-forming strip 181, while the longitudinal fold line 178 adjacent the discontinuous edge 151 similarly defines therewith a ninth flange-forming strip 182. A cut-out portion 183 is provided between the fifth flange-forming strip 172 of the first side panel portion 155 and the eighth flange-forming strip 181 of the bottom panel portion 156. A similar cut-out portion 184 is formed between the sixth flange-forming strip 173 of the first side panel portion 155 and the ninth flange-forming strip 182 of the bottom panel portion 156.

The bottom panel portion 156 is joined to the second side panel portion 157 by an integral tenth flange-forming strip 185. A pair of spaced parallel longitudinal fold lines 186 and a pair of spaced parallel transverse fold lines 187 in the second panel portion 157 bound a second side panel 188. An eleventh flange-forming strip 190 is defined by the discontinuous longitudinal edge 150 and the adjacent longitudinal fold lines 186 while a twelfth flange-forming strip 191 is set off by the discontinuous longitudinal edge 151 and the adjacent longitudinal fold line 186. A thirteenth flange-forming strip 192 is set off by the second transverse edge 153 and the adjacent transverse fold line 187 of the second panel portion 157. A cut-out portion 193 is formed between the eleventh flange-forming strip 190 and the eighth flange-forming strip 181 of the bottom panel portion 156. A similar cut-out portion 194 is provided between the twelfth flange-forming strip 191 of the second panel portion 157 and the ninth flange-forming strip 182 of the bottom panel portion 156.

Before the three-piece composite blank 141 is erected to form the carton 140 of FIGURES 16 through 19, the front panel 142 and the back panel 143 or the elongated substantially rectangular strip 144 may be lined with polyethylene or a similar hot-melt adhesive whereby particular portions of the three-piece composite blank 141 can be joined to each other during the fabrication of the carton 140 by the mere application of heat thereto. Alternatively, all of the flange-forming strips except the third flange-forming strip 166 and the thirteenth flange-forming strip 192 may be coated with an adhesive prior to erecting the carton 140. The flange-forming strips 166 and 192 are not coated with an adhesive since the same form a spout portion of the carton 140 in a manner to be hereinafter described, and the spout portion is sealed only after the carton has been filled. Another way of treating the three-piece composite blank 141 prior to the erection of the carton 140 is to apply an adhesive to the front and back panels 142 and 143 respectively, along and adjacent the edges 145, 146, 147 and 148; and further applying an adhesive to the flange forming strips 167, 176 and 185 of the elongated blank 144.

Irrespective of the manner in which the portions of the three-piece composite blank 141 are joined, the carton 140 formed therefrom has no raw edges exposed to the interior thereof and when erected, the carton 140 has three reinforcing flanges extending from each corner where three planes of three adjacent panels intersect.

The elongated substantially rectangular blank 144 is preferably constructed from a thinner longer fibered paper stock material than the material from which the front panel 142 and the back panel 143 are constructed. The relatively stiffer and thicker panels 142 and 143 lend rigidity to the carton 140 while the relatively thinner longer fibered material of the rectangular blank 144 permits easy bending of this blank during the erection of the carton 140.

The elongated rectangular blank 144 is folded to a substantially rectangular cross-sectional configuration, as is best illustrated in FIGURE 17 of the drawings. The fourth flange-forming strip 167 is folded along the fold lines 161 and 171, and is secured to a portion of the side panel 168 to define therewith a first reinforcing flange. The seventh flange-forming strip 176 is similarly folded and secured to a portion of the first side panel 168 to form a second reinforcing flange. A third reinforcing flange is formed by the tenth flange-forming strip 185 overlying and secured to an edge portion of the second side panel 188. A fourth reinforcing flange is formed by the abutment of the third flange-forming strip 166 and the thirteenth flange-forming strip 192 which are adhesively or otherwise secured together after the carton has been completely erected and filled.

Four additional reinforcing flanges are formed by overlying and securing the flange-forming strips 162, 172, 181 and 190 to the back panel 143 along the respective edges 147, 145, 148 and 146. The flange-forming strips 163, 173, 182 and 191 of the rectangular blank 144 are similarly secured adjacent the respective edges 147, 145, 148 and 146 of the front panel 142. Thus, the six sided carton 140 of FIGURES 16 through 19 is provided with twelve reinforcing flanges and there are three reinforcing flanges at every corner of intersection between any three panels. For example, in the uppermost right hand corner of FIGURE 17 the back panel 143, the top panel 158 and the first side panel 168 intersect at a common corner at the fold line 161. At this corner the flange-forming strip 162 and the portion of the back panel 143 adhesively or otherwise secured thereto defines a first reinforcing flange. A second reinforcing flange is formed by the flange-forming strip 172 secured to the back panel 143 adjacent its edge 145. A third reinforcing flange is formed by the flange-forming strip 167 secured to the portion of the side panel portion 155 adjacent the fold line 171. Exceptional strength at this corner, as well as each of the remaining corners of blank of the carton 140 is affected by the reinforcing flanges. At the same time, no internal raw edges are created (see FIGURES 17 through 19). Furthermore, the carton 140 is completely symmetrical and yields an identical cross-sectional configuration when a cross-section is taken in each of three mutually perpendicular planes. For example, FIGURE 17 is a cross-section of the carton 140 taken through the X–Y plane thereof. An identical cross-sectional configuration of the carton 140 is yielded when either an X–Z plane or a Y–Z plane is taken through the carton 140. This symmetry additionally enhances the reinforcement of the carton 140.

While the substantially elongated rectangular blank 144 is capable of being folded to the cross-sectional configuration illustrated in FIGURE 17 of the drawings, it is also possible to fold the rectangular blank 144 to achieve a different cross-sectional configuration in the X–Y plane through the carton 140 while maintaining the cross-sectional configuration shown in FIGURE 17 in an X–Z plane, a Y–Z plane or both. For example, as shown in FIGURE 21 of the drawings, the rectangular blank 144 has been folded to form two spaced parallel flanges 195 and 196 which are normal to the second side panel 188 while a third reinforcing flange 197 is co-planar with the first side panel 168 but normal to a fourth reinforcing flange 198.

In FIGURE 22 of the drawings, the substantially rectangular elongated blank 144 has been folded to form a pair of spaced parallel reinforcing flanges 200 and 201, and two other reinforcing flanges 202 and 203 which are in a common plane normal to a plane through either of the reinforcing flanges 200 or 201.

In FIGURE 23 of the drawings the substantially elongated rectangular blank 144 has been folded to form a first pair of reinforcing flanges 204 and 205 which are normal to each other, as well as a second pair of reinforcing flanges 206 and 207 which are also normal to each other. The opposite flanges 205 and 206, as well as the flanges 204 and 207 are in parallel relationship to each other.

The substantially rectangular cross-sectional configuration of the carton 140 may be modified in a variety of ways. Thus, as is shown in FIGURE 24 of the drawings a substantially elongated rectangular blank 208 has been folded to form a pentagonal cross-sectional configuration. Five reinforcing flanges 210–214 are shown and each of the reinforcing flanges is formed at an intersection of any two adjacent panels. For example, the reinforcing flange 214 is formed at the intersection of the panels 218 and 219. Furthermore, the adjacent panels 218 and 219 intersect each other at an obtuse angle, which is true for each of the other remaining intersecting panels. Thus, the cross-sectional configuration of the carton 140 is not limited to a rectangle but may be any one of a variety of different cross-sectional configurations in which the enclosing panels form obtuse included angles or both obtuse and acute included angles.

This latter construction is shown in FIGURE 25 of the drawings in which a substantially elongated rectangular blank 220 has been folded into a substantially trapezoidal cross-sectional configuration defined by the panels 221–224. Four reinforcing flanges 225–228 are formed from the elongated rectangular blank 220. The panels 221 and 222, and the panels 221 and 224 intersect each other at an acute angle while the inner section between the panels 222 and 223, and 223 and 224 defines a pair of included acute angles.

Referring to FIGURE 20 of the drawings, the substantially elongated rectangular blank 144 included a plurality of cut-out portions 174, 175, 183, 184, 193 and 194. These cut-out portions facilitate the folding of the rectangular blank 144 during the erection of the carton 140. These cut-out portions represent a loss of material which is avoided in another embodiment of this invention by cutting and scoring a blank, such as the blank 144 along the cut-out portions thereof, rather than actually forming cut-out portions.

The above construction is shown in FIGURES 26 through 28 of the drawings, and as is best illustrated in FIGURE 27, a portion of an elongated substantially rectangular blank 230 having an elongated edge 231 is provided with a longitudinal fold line 232, a longitudinal fold line 233, a transverse fold line 234, and another transverse fold line 235. A side panel 236 is partially bounded by the fold lines 233 and 235 while a top panel 237 is partially bounded by the fold lines 232 and 234. A fold line 238 forming a continuation of the transverse fold line 235 terminates at the longitudinal edge 231 of the substantially rectangular blank 230. A severance or cut line 240 extends from the inner section of the fold lines 232 and 234 and terminates at the longitudinal edge 231 of the blank 230. Another severance or cut line 241 extends between the junctions of the fold lines 232 and 234, and 233 and 235. The longitudinal edge 231, the severance line 240, the severance line 241 and the fold line 238 bound a substantially rectangular tab 242. The tab 242 occupies an area substantially equal to any one of the areas of the cut-out portions of FIGURE 20.

A first flange-forming strip 243 is set off by the longitudinal edge 231, the fold line 238 and the fold line 233 of the rectangular blank 230. A second flange-forming strip 243 is partially set off by the longitudinal edge 231, the severance line 240 and the longitudinal fold line 232. A third flange-forming strip 244 is partially set off by the transverse fold line 234, the severance line 241 and the transverse fold line 235.

The substantially elongated rectangular blank 230 of FIGURE 27 is folded in a manner substantially identical to that discussed in connection with FIGURE 20, except for the fact that the tab 242 overlies and is adhesively secured to a reinforcing flange formed in part by the flange-forming strip 244. When the blank 230 is coated with a hot-melt coating such as polyethylene, the surface of the tab 242 so coated is in contact with a portion of the flange-forming strip 244 and may be heat-bonded thereto. The completely erected blank 230 may then be similarly bonded to a panel 245 in a manner identical to that heretofore discussed in connection with FIGURE 20.

While the tab 242 of FIGURE 26 overlies and is secured to the flange-forming strip 244, it does not necessarily have to be so positioned. For example, the tab 242 may be readily positioned and adhered between the flange-forming strip 243 and the panel 245. Furthermore, during the folding of the blank 230 the tab 242 could be positioned between the flange-forming strip 244 and the top panel 237.

In the several embodiments of this invention disclosed in FIGURES 16 through 28, the substantially rectangular elongated blanks 144, 208, 220 and 230, were each constructed from a single elongated piece of material. However, any one or all of the panel portions 155 through 157, 215 through 219, 221 through 224, 236 and 237 could all be made of single individual rectangular blanks secured together in the manner heretofore discussed in connection with FIGURES 1 through 15 of the drawings.

Irrespective of whether these elongated blanks are constructed from a single integral piece of material or a plurality of pieces of material secured together, the cartons formed thereby have no internally exposed raw edges, are essentially waste-free, and are relatively easily collapsible and component-interchangeable.

All of the flanges strengthen the respective edges and decrease the tendency of the panels to bulge when the cartons are filled. The flanges in addition to performing a reinforcing function, serve as fenders or energy absorbers to protect the contents of the cartons from punctures, crushing and shock during shipping or use.

The front and back panels of FIGURES 20 through 25 are simple flat rectangles which can be purchased as such, thereby involving no waste of material, no die cutting, no scoring and no particular bending properties. These panels can be made of relatively inexpensive material of a relatively stiff construction. These panels may also be attached to pentagon, trapezoidal or other diversely shaped front and back panels.

When the top, side, or bottom panels are constructed from individual pieces of material the grain of one or more of these panels could run at right angles to the grain direction of any adjacent panel whenever an advantage would develop thereby either for ease or economy of manufacturing or for carton-foldability, much in the same manner as discussed in connection with FIGURES 5 through 15 of the drawings. When individual panels are employed, a variety of choices are available as to which of the panels may be left off entirely or put on only after the carton has been filled. Furthermore, since all of the flanges secured to the front and back panels of the cartons of FIGURES 16 through 28 are directed externally of the carton, any one of these flanges may be left totally or in-part unsealed until after filling.

A carton 247 illustrated in FIGURES 29 and 30 of the drawings includes a top 248 and a bottom 250. The bottom 250 of the carton 247 includes a substantially rectangular wall 251 having an upstanding rectangular tubular body 252 adhesively secured to the wall 251 by a plurality of inwardly directed flanges 253.

The top 248 of the carton 247 includes a substantially rectangular top or panel and a substantially rectangular tubing depending skirt 255. The skirt 255 is constructed from an elongated substantially rectangular blank, similar to the rectangular blank 144 of FIGURE 20, except that the cut-out portions have not been removed and the blank 255 is a continuous non-severed blank. Furthermore, the flange-forming strips on either longitudinal edge of the blank 144 have been removed to form the blank 255.

The skirt 255 includes four panels 256, 257, 258 and 260 folded to form four reinforcing flanges 261, 262, 263 and 264. Each of the panels 256, 257, 258 and 260 includes an identical flange-forming strip 265 (only two of which are shown in FIGURE 29). Each two intersecting panels unite with the top wall 254 to form a corner of the top 248. The respective intersecting panels forming the corners are each folded identically and a description of the folding of the panels 258 and 260 of FIGURE 31 is deemed sufficient for an understanding of each corner structure of the top 248.

As is shown in FIGURE 31 of the drawings, the panel 260 is folded in the direction of an arrow 266 about a fold line 267 to form the reinforcing flange 262. During this movement a portion of the reinforcing flange 262 is folded about a fold line 268 in the direction of an arrow 270 until the flange-forming strips 265 of the panels 258 and 260 are normal to each other. At this time the portion of the reinforcing flange 262 folded about the fold line 268 is in alignment with an edge 271 of the flange-forming strip 265 of the panel 258. Thus, no cutouts, perforations or severance lines are necessary and the corner construction of the top 248 is completely liquid and sift-proof.

When the top 248 is telescoped about the bottom 250 of the carton 247 in the manner illustrated in FIGURE 30, a full-flanged carton is formed. That is, twelve reinforcing flanges strengthen the carton 247 and serve as fenders or energy absorbers in a manner similar to that heretofore discussed to protect any contents within the carton 247 from inadvertent or accidental damage thereto.

Referring to FIGURES 32 through 35 of the drawings, a carton 273 includes a front panel 274, a pair of identical opposed side panels 275, a bottom panel (not shown) and a back panel 276. The side panels 275 and the bottom panel (not shown) are formed from a single strip of paper stock material while a top panel 277 is formed from a portion of the back panel 276, as is best illustrated in FIGURE 32.

The top panel 277 is provided with a pair of spaced parallel longitudinal fold lines 278 and a pair of spaced parallel transverse fold lines 280. The fold lines 278 and 280 set off four flange-forming strips 281–284 of the top panel 277. The top panel 277 is folded about a transverse fold line 285 to form a substantially tray-shaped panel as is best illustrated in FIGURE 32. The particular folding of the top panel 277 at the corners thereof is clearly illustrated in FIGURE 35 of the drawings and a description thereof is considered unnecessary.

FIGURE 34 of the drawings illustrates the carton 273 of FIGURES 32 and 33 prior to being completely collapsed. When in a fully collapsed position, the carton 273 occupies very little space, is subjected to very little if any internal stresses, and like the cartons heretofore discussed is full-flanged.

A carton 286 of FIGURE 36 includes a front panel 287, a side panel 288, a back panel 289, an opposed second side panel 290, a bottom panel (not shown) and a top swing-out panel 291. The carton 286 is full-flanged though only a pair of reinforcing flanges 292 are illustrated. The swing-out top panel 291 is secured to a flange-forming strip 293 of the side panel 290. After the carton 286 has been filled the swing-out top panel 291 is folded about a transverse fold line 294 of the side panel 290 in the direction of the arrow 295. This folding movement brings the flange-forming strip 293 into contact with an upper portion of the side panel 290 as shown by the broken arrow of FIGURE 36. Thus, a reinforcing flange is formed by the portion of the side panel 290 overlapped by the flange-forming strip 293. Each of three remaining sides 296–298 of the swing-out top panel 291 form three additional reinforcing flanges with the respective back panel 289, the side panel 288 and the front panel 287.

While examples of preferred forms of a plurality of cartons are disclosed herein, it is to be understood that variations in the form and material of these cartons may be made without departing from the spirit and scope of the invention as defined in the appended claims.

I claim:

1. A carton comprising a bottom panel, two opposed side panels, a top panel, a front panel and a back panel, the plurality of panels forming a carton body, said top panel being formed from a continuation of one of said panels, said top panel including a central panel portion recessed in said body, a flange-forming portion of said top panel being secured to each of the side, front and back panels thereby forming reinforcing flanges at the top of said body, said reinforcing flanges intersecting each other and being reinforced at said intersection by a folded corner construction, said corner construction including an overfolding of material of one of the flanges upon the material of an adjacent flange, said side panels each including a pair of spaced flange-forming panel portions, one of the panel portions of each of the pair of panel portions being overlyingly secured to the front panel and the other of the pair of panel portions of each of the pair of panel portions being overlyingly secured to the back panel thereby forming a reinforcing flange at each juncture of adjacent panels.

2. The carton as defined in claim 1 wherein at least three flanges meet at each juncture of the adjacent panels, one of said at least three flanges is normal to the remaining two flanges, and the remaining two flanges lie in a common plane.

3. A carton comprising a bottom panel, two opposed side panels, a top panel, a front panel, and a back panel, the plurality of panels forming a carton body, each of the two opposed side panels including a pair of spaced longitudinal flange-forming panel portions, one of the longitudinal panel portions of each of the pair of longitudinal panel portions being overlyingly secured to the front panel along a longitudinal portion thereof, the other of the pair of panel portions being overlyingly secured to the back panel along a longitudinal portion thereof thereby forming an outwardly directed reinforcing flange at each juncture of said front and back panels and said side panels, said top panel having a central portion and a plurality of opposed longitudinal and transverse flange-forming portions, said central portion being recessed in said carton and said flange forming portions of the top panel being directed outwardly of said body and secured to upper transverse edge portions of said side, front and back panels thereby forming an outwardly directed reinforcing flange at each juncture of said top panel with said side, front and back panels, and adjacent longitudinal and transverse flange forming portions being overfolded to define a sift-proof corner construction.

4. The carton as defined in claim 3 wherein one of said plurality of opposed longitudinal and transverse flange-forming portions is hingeably integrally connected to one of said panels other than said top panel.

5. The carton as defined in claim 4 wherein two adjacent flanges of said flanges lie in a common plane and normal to at least another reinforcing flange joined to said two adjacent flanges.

6. A carton corner construction comprising first, second and third panels, a portion of said first panel abuttingly contacting a portion of said second panel to define therewith a first flange, a portion of said second panel abuttingly contacting a portion of said third panel to define therewith a second flange, a portion of said first panel abuttingly contacting a portion of said third panel to define therewith a third flange, two of said flanges being in a common plane, the remaining one of said flanges being generally normal to said last mentioned two flanges, said first, second and third flanges angularly intersecting each other and being reinforced at said intersection by a folded portion of the material of at least two of said flanges, and said folded portion including an overfolding of the material of one of the flanges upon the material of an adjacent flange.

7. A carton corner construction comprising first, second and third panels, a portion of said first panel abuttingly contacting a portion of said second panel to define therewith a first flange, a portion of said second panel abuttingly contacting a portion of said third panel to define therewith a second flange, a portion of said first panel abuttingly contacting a portion of said third panel to define therewith a third flange, two of said flanges being in a common plane, the remaining one of said flanges being generally normal to said last mentioned two flanges, said first, second and third flanges intersecting each other at generally right angles and being reinforced at said intersection by a folded portion of the material of at least two of said flanges, and said folded portion including an overfolding of the material of one of the flanges upon the material of an adjacent flange.

8. A carton comprising a bottom panel, two opposed side panels, a top panel, a front panel, and a back panel, the plurality of panels forming a carton body, said top panel being formed from a continuation of one of said side, front and back panels, said top panel including a central panel portion recessed in said body, said central panel portion being bounded along its periphery by a plurality of flange forming portions, said flange forming portions being directed axially outwardly of said body and being secured to a respective one of said side, front and back panels in planar abutting contact to form therewith reinforcing flanges at the top of said body disposed generally in the plane of said side, front and back panels, adjacent ones of said flange forming portions being partially folded one upon another to define a folded corner construction at each corner of the body, each folded corner construction being disposed at the intersection of at least three of said reinforcing flanges, one of said three flanges being normal to the remaining two flanges, and the remaining two flanges lying in a common plane.

9. The carton as defined in claim 2 wherein the material of at least one of said opposed side panels is transparent.

10. The carton as defined in claim 2 wherein the material of said front, back and side panels is paper stock and the paper stock material of the side panels has longer fiber than the fibers of the paper stock material of the front and back panels.

11. The carton as defined in claim 2 wherein the material of said front and back panels is stiff paper stock paneling and the transparent material of said one opposed side panel is plastic.

12. The carton as defined in claim 2 wherein said plurality of panels are formed from at least three separate pieces of material.

13. The carton as defined in claim 2 wherein any three planes taken normal to each other and through the carton define an identical cross-sectional configuration.

14. The carton as defined in claim 2 wherein the area of any one of said front and back panels is greater than the area of the cross-sectional configuration defined by any one of said three planes taken through the carton.

15. The carton as defined in claim 2 wherein said top panel is hingedly connected to one of said plurality of reinforcing flanges.

References Cited by the Examiner

UNITED STATES PATENTS

| | | | |
|---|---|---|---|
| 1,745,101 | 1/1930 | Labombarde | 229—43 |
| 1,770,819 | 7/1930 | Tamke et al. | 229—37 |
| 2,233,704 | 3/1941 | Hohl et al. | 229—55 |
| 2,444,895 | 7/1948 | Ringler | 229—43 |
| 2,573,524 | 10/1951 | Weisberg | 229—37 |
| 2,649,238 | 8/1953 | Brooks | 229—44 |
| 3,002,328 | 10/1961 | Monroe et al. | |
| 3,057,531 | 10/1962 | Preen | 229—7 |
| 3,087,668 | 4/1963 | Oler | 229—53 |
| 3,101,879 | 8/1963 | Meyer et al. | 229—7 |
| 3,107,839 | 10/1963 | Kauffeld | 229—17 |
| 3,124,294 | 3/1964 | Zerlin | 229—17 |

GEORGE O. RALSTON, *Primary Examiner.*

FRANKLIN T. GARRETT, *Examiner.*